April 30, 1968   J. F. M. LE FOURNIER   3,380,292
DISTRIBUTION OF FLUIDS IN A MEDIUM
Filed Jan. 28, 1966
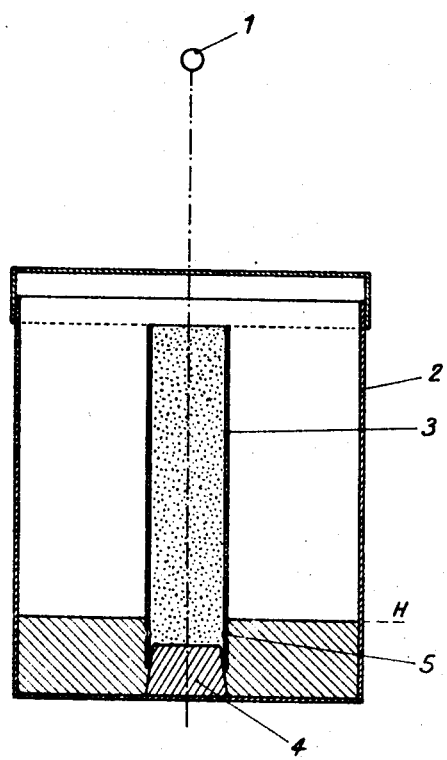
INVENTOR
JACQUES F. M. LE FOURNIER
BY Young + Thompson
ATTYS.

3,380,292
DISTRIBUTION OF FLUIDS IN A MEDIUM

Jacques Francois Marie Le Fournier, l'Hautil par Triel, France, assignor to Compagnie d'Exploration Petroliere, Paris, France, a French anonymous company
Filed Jan. 28, 1966, Ser. No. 523,722
Claims priority, application France, Jan. 29, 1965, 3,649, Patent 1,431,080
7 Claims. (Cl. 73—38)

ABSTRACT OF THE DISCLOSURE

The distribution of two immiscible fluids in a porous medium can be studied by replacing them in a test specimen with hardened plastic of different colors. To do this, a binary fluid system imitating the physical behavior of the binary system to be studied is introduced into a porous medium, at least one of the fluids being a thermosetting resin. The necessary hydrostatic head is duplicated by centrifuging the specimen while the resin hardens. The other fluid is represented by a liquid thermosetting resin of different color, which is introduced simultaneously with or subsequently to the first liquid resin.

---

The present invention relates to the study and determination of the distribution of two non-miscible fluids in a porous medium with respect to capillary pressure.

Such a determination is important in numerous technical fields and although it is specially set forth hereafter for its use in connection with oil research and production, its field of application extends to all branches of industries that deal with the problems of the circulation of fluids through porous media.

In its application to oil production, such determination actually permits a better exploitation of discovered oil fields insofar as it makes it possible to detect the position or space occupied by fluids in the reservoir rock or carrier bed and to derive useful additional numerical data for use in the production of hydrocarbons. The said determination may particularly constitute a practical means for controlling such industrial results as are obtained with the several techniques of the so-called "secondary recovery" of fluids in an oil-bearing layer or bed.

For geological applications in connection with oil research and exploitation, said determination furnishes to those skilled in the art of ground exploration data enabling them to orientate their research work by the use of information regarding the relationship between rock petrography and the relative quality of reservoirs with respect to different fluids.

The primary object of the invention is to provide a method for effecting the aforesaid determination by a microspocical observation of thin cuttings, following stabilization, connoting the distribution of two-phase mixtures of fluids in a porous medium under given conditions of capillary pressure.

Another object of the invention is to provide a method for determining the distribution of two non-miscible fluids in a porous medium comprising the steps of creating inside a system constituted by a sample of the porous medium under consideration, that has been spatially defined and saturated with two non-miscible test fluids, a state of equilibrium governed at each point by a given capillary pressure (which is the difference between the static pressures of the two fluids adjacent a given point on their interface), then preserving this state of equilibrium by fixing the distribution of said fluids, producing a series of thin cuttings from the sample at preset levels, and proceeding with a microscopical observation of said thin cuttings for achieving said determination.

According to a preferred method for carrying out the method according to the invention, the aforesaid state of equilibrium in the system is obtained by a so-called "centrifugal desorption" by using during this desorption a couple of test fluids comprising air and a thermosetting resin to which has been added a "marker" intended subsequently to make visible or reveal its presence, and said state of equilibrium is preserved by maintaining the physical factors governing said state of equilibrium until the resin has been polymerized, whereafter air is replaced by another resin capable of being easily differentiated from the first named resin during a supplementary saturation step. The "marker" which is present in the first-cited resin may be a coloring agent whereas the second resin may have a color different from the one of the first-cited resin.

For a better understanding of the invention, it will now be described nonlimitatively with reference to the accompanying drawing whose single figure is a diagrammatic sectional view of a device for carrying into practice the present method.

For determining the distribution of two non-miscible fluids in a porous medium such as a porous rock by using the method according to the invention, there is first effected a saturation of a rock sample in an impregnation cell permitting the production of a high degree of vacuum and a high pressure (for example a pressure about 2,100 p.s.i.) while using a suitable temperature which has been selected in terms of the characteristics of whatever resin has been used, for instance 160° F. when dealing with a thermosetting resin matching the hereafter indicated composition. Advantageously this resin is a fluorescent resin and use can be made of a red resin having the following composition F Prochal's Araldite + Prochal's 905 hardener + Prochal's DY 061 accelerator + Prochal's RD1 diluent + Ciba's B rhodamine.

When saturation has been achieved in the aforesaid manner, a partial desorption is produced by centrifugation. There is used for that purpose the device as shown diagrammatically on the drawing. This device comprises a centrifuging apparatus defined solely by its rotational axis 1 and provided with special buckets designated by the reference 2 and adapated to receive sample-carrying tubes 3 closed at their bottom end as indicated at 4 and having at their bottom end small diameter apertures 5. This centrifuging apparatus is provided with a driving device for revolving the same at an accurate angular speed which can be adjusted for example to a range extending from 750 to 10,000 r.p.m. This speed may be controlled for example by a stroboscopical device. A heating device including a thermostatic control is also provided.

After sample-carrying tube 3 has been placed in the bucket 2, the centrifuging apparatus is set into operation and desorption is effected at an accurately controlled speed and temperature until the resin is gelified.

Following the starting of the centrifuging apparatus, a state of equilibrium progressively sets in inside the assembly, any excess resin flowing through the apertures 5 and penetrating into the bucket 2 and collecting in the bottom of this bucket thereby providing an air-resin contact surface having a large radius of curvature, which contact surface is approximated by the plane H in the drawing, whereafter said surface serves as a reference plane as indicated hereafter.

After hardening of the resin has taken place, a further saturation under vacuum and pressure is effected by means of a thermosetting resin having a color different from that of the first-cited resin, for example a blue color, by proceeding as described hereinbefore. The blue resin may then have for instance the following composition Shell's DER 331 (Epikote 828)+DETA hardener manufactured by Le Laboratoire du Bois de Boulogne+Prochal's RD1 diluent+Ciba's B oracete. During this step, air that had penetrated into the sample during desorption is replaced by the new resin which so to speak makes readily visible the spaces occupied by the air constituting the second fluid of the tested fluid couple during observation of a thin slice of the specimen. Once saturation has been effected, the resin is baked in a suitable oven.

A system is thus obtained wherein the aforesaid state of equilibrium has been preserved. For the microscopical examination of this system, thin slices are then cut off at levels set with respect to the aforesaid reference plane H and there is determined by microscopical observation the distribution of the resins. This distribution results from a state of equilibrium which can simulate the one which would prevail in the rock between two natural fluids under preset conditions of the layer or bed since the aforesaid sequence of steps is a true reconstitution forming a distribution analogous to that of a natural system prevailing under the aforesaid conditions.

Demonstration can actually be made by a classical reasoning that the achieved type of distribution corresponds with a state of equilibrium which is controlled by the following factors, namely morphology of the porosity net, rotational speed of the centrifuging apparatus, density of resin, distance between the reference plane and the rotational axis, and distance between the cutting off level and the rotational axis, furthermore that the type of distribution of the two resins is comparable with the one which would prevail in the same net under preset conditions of capillary pressure for a given fluid couple.

Microscopical examination of thin cuttings which as such is known in the art then permits said determination to be effected in a reliable and accurate way.

Modifications may be introduced in the field of technical equivalencies without departing from the ambit of the subjoined claims.

What is claimed is:

1. A method for determining the distribution of two non-miscible fluids in a porous medium such as an oil-bearing rock comprising the steps of spatially defining a sample of said medium, saturating said sample with a first thermosetting resin having a given color and with air, subjecting said saturated sample to a centrifugal desorption until a state of equilibrium between said first thermosetting resin and air is established, maintaining said state of equilibrium until it is fixed by curing said first resin, replacing the air by a second thermosetting resin having a different color, curing said second resin, producing thin cuttings from said sample, and subjecting said cuttings to a microscopical observation for achieving said determination, said two thermosetting resins imitating the pertinent physical behavior of said two non-misicible fluids.

2. A method as claimed in claim 1, in which both of said thermosetting resins are introduced by subjecting the sample to vacuum, contacting the sample with the thermosetting resin in liquid phase, and then subjecting the sample to high fluid pressure.

3. A method for studying the distribution of two non-miscible fluids in a porous medium, comprising the steps of establishing within a sample of said porous medium two non-miscible fluids under equilibrium conditions of distribution, hardening at least one of said fluids under said equilibrium conditions, establishing a hardened material in the spaces occupied by the other of said fluids with said hardened material of a distinctively different color from said one hardened fluid, and examining microscopically a surface of the sample thus produced.

4. A method as claimed in claim 3, and centrifuging said sample during establishment and preservation of said state of equilibrium.

5. A method as claimed in claim 3, said one fluid and said hardened material both being thermosetting resins.

6. A method as claimed in claim 3, said non-miscible fluids being a thermosetting resin and air, said hardened material being a thermosetting resin, and replacing said air with said material after hardening of said one fluid.

7. A method as claimed in claim 6, and establishing said equilibrium between said one fluid and air by saturating said sample with said one fluid, and then centrifuging said saturated sample in air to replace a portion of said one fluid with air.

References Cited
UNITED STATES PATENTS

| | | | |
|---|---|---|---|
| 2,207,348 | 7/1940 | Jones et al. | 73—38 X |
| 2,268,627 | 1/1942 | Silverman | 73—38 X |

LOUIS R. PRINCE, *Primary Examiner.*

W. M. HENRY, *Assistant Examiner.*